(12) United States Patent
Yang

(10) Patent No.: US 11,616,270 B2
(45) Date of Patent: Mar. 28, 2023

(54) BATTERY WITH THERMAL RUNAWAY PREVENTION

(71) Applicant: GM Global Technology Operations LLC, Detroit, MI (US)

(72) Inventor: Xiaofeng Yang, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 211 days.

(21) Appl. No.: 17/078,466

(22) Filed: Oct. 23, 2020

(65) Prior Publication Data

US 2022/0131120 A1    Apr. 28, 2022

(51) Int. Cl.
*H01M 50/383* (2021.01)
*H01M 10/656* (2014.01)
*H01M 50/20* (2021.01)

(52) U.S. Cl.
CPC ....... *H01M 50/383* (2021.01); *H01M 10/656* (2015.04); *H01M 50/20* (2021.01)

(58) Field of Classification Search
None
See application file for complete search history.

(56) References Cited

U.S. PATENT DOCUMENTS

| 2014/0342201 | A1* | 11/2014 | Andres | ............... | H01M 10/613 165/80.4 |
| 2015/0118588 | A1* | 4/2015 | McLean | ............ | H01M 8/04208 429/421 |
| 2019/0299812 | A1* | 10/2019 | Du | .................... | H01M 10/6567 |

* cited by examiner

*Primary Examiner* — Carmen V Lyles-Irving
(74) *Attorney, Agent, or Firm* — Vivacqua Crane PLLC

(57) ABSTRACT

A battery includes a plurality of battery cells, each battery cell including a core, a source of thermal control fluid in fluid communication with the core, and a first pressure sensitive valve positioned between the core and the source of thermal control fluid, the first pressure sensitive valve adapted to open when pressure within the core exceeds a first pre-determined value.

14 Claims, 3 Drawing Sheets

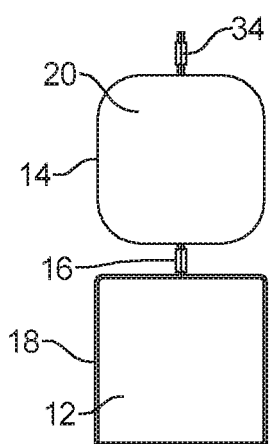
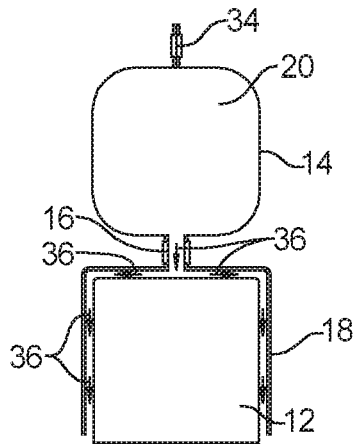
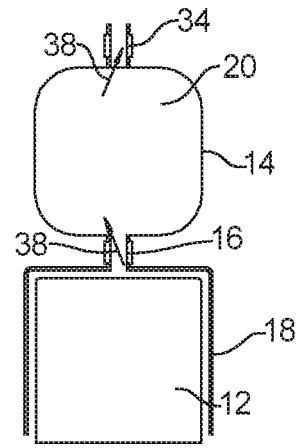
FIG. 5A    FIG. 5B    FIG. 5C
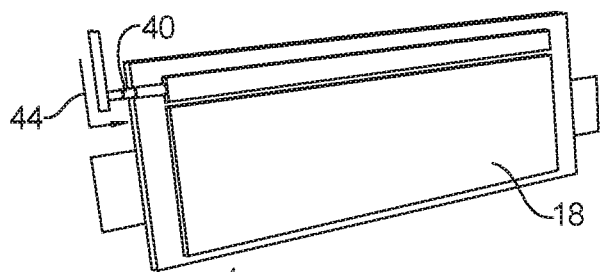
FIG. 6
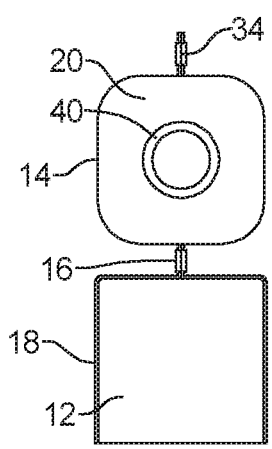
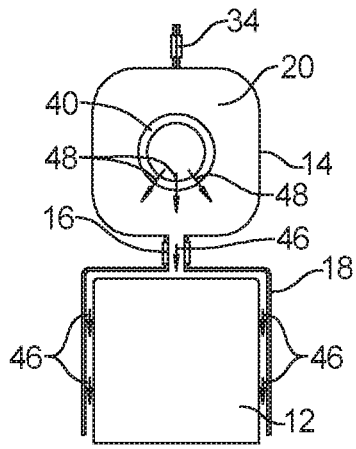
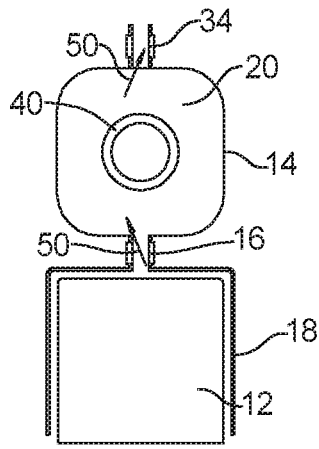
FIG. 7A    FIG. 7B    FIG. 7C

BATTERY WITH THERMAL RUNAWAY PREVENTION

INTRODUCTION

The present disclosure relates to batteries and battery cells for electric and hybrid electric vehicle. More specifically, the present disclosure describes a battery and battery cell adapted to automatically prevent a thermal runaway event.

An electric-vehicle battery is a battery used to power the electric motors of a battery electric vehicle (BEV) or hybrid electric vehicle (HEV). These batteries are usually rechargeable batteries, and are typically lithium-ion batteries. These batteries are specifically designed for a high ampere-hour (or kilowatt-hour) capacity.

Electric-vehicle batteries differ from starting, lighting, and ignition batteries as they are designed to give power over sustained periods of time and are deep-cycle batteries. Batteries for electric vehicles are characterized by their relatively high power-to-weight ratio, specific energy and energy density. Smaller, lighter batteries are desirable because they reduce the weight of the vehicle and therefore improve its performance. Compared to liquid fuels, most current battery technologies have much lower specific energy, and this often impacts the maximum all-electric range of the vehicles.

The most common battery type in modern electric vehicles are lithium-ion and lithium polymer, because of their high energy density compared to their weight. Other types of rechargeable batteries used in electric vehicles include lead-acid ("flooded", deep-cycle, and valve regulated lead acid), nickel-cadmium, nickel-metal hydride, and, less commonly, zinc-air, and sodium nickel chloride ("zebra") batteries. The amount of electricity (i.e. electric charge) stored in batteries is measured in ampere hours or in coulombs, with the total energy often measured in kilowatt-hours.

Advances in lithium-ion battery technology have been driven by demands from portable electronics, laptop computers, mobile phones, and power tools. The BEV and HEV marketplace has reaped the benefits of these advances both in performance and energy density. Unlike earlier battery chemistries, notably nickel-cadmium, lithium-ion batteries can be discharged and recharged daily and at any state of charge.

Thermal runaway is a significant risk present in batteries. It occurs due to a battery cell failure of some kind, occasionally as simple as the separator between the anode and the electrolyte breaking down. This generates an increase in temperature, creating a chain reaction in which more energy is released, causing the electrolyte to break down into flammable gasses. Once the separator melts, the cathode of the battery breaks down further fueling the fire with oxygen, triggering an uncontrolled positive feedback loop, often leading to a destructive result. The risk of thermal runaway begins at 60° C. and becomes extremely critical at 100° C. Once the process has begun, temperatures rise rapidly within milliseconds—creating temperatures of around 400° C. It is particularly prevalent in lithium-ion batteries.

Thus, while current batteries and battery cells achieve their intended purpose, there is a need for a new and improved system and method for automatically controlling a battery that is approaching or has begun a thermal runaway event.

SUMMARY

According to several aspects of the present disclosure, a battery includes a plurality of battery cells, each battery cell including a core, a source of thermal control fluid in fluid communication with the core, and a first pressure sensitive valve positioned between the core and the source of thermal control fluid, the first pressure sensitive valve adapted to open when pressure within the core exceeds a first pre-determined value.

According to another aspect, within each of the plurality of battery cells, the source of thermal control fluid is positioned above the core, wherein when the first pressure sensitive valve is opened gravity will cause the thermal control fluid to flow downward into the core.

According to another aspect, each battery cell further includes a second pressure sensitive valve adapted to open when pressure within the source of thermal control fluid exceeds a second pre-determined pressure.

According to another aspect, the second pre-determined pressure is lower than the first pre-determined pressure.

According to another aspect, the second pressure sensitive valve of each of the plurality of battery cells is adapted to vent contents of the source of thermal control fluid out of the battery cell.

According to another aspect, the battery further includes a reservoir of thermal control fluid, wherein the source of thermal control fluid of each of the plurality of battery cells is in fluid communication with the reservoir of thermal control fluid.

According to another aspect, each of the plurality of battery cells includes a one-way valve positioned between the source of thermal control fluid and the reservoir of thermal control fluid, wherein for each of the plurality of battery cells, the one way valve is adapted to allow thermal control fluid to flow from the reservoir of thermal control fluid into the source of thermal control fluid and to prevent flow from the source of thermal control fluid to the reservoir of thermal control fluid.

According to another aspect, the reservoir of thermal control fluid is adapted to supply thermal control fluid to the source of thermal control fluid within each of the plurality of battery cells at a pressure less than the first and second pre-determined pressures.

According to another aspect, the reservoir of thermal control fluid is positioned above each of the plurality of battery cells, wherein, for each of the plurality of battery cells, when the first pressure sensitive valve is opened gravity will cause the thermal control fluid to flow from the reservoir of thermal control fluid downward into the source of thermal control fluid.

According to another aspect, the first and second pressure sensitive valves can be repeatedly opened and closed and are re-usable.

According to another aspect, the first and second pressure sensitive valves are zip-lock valves.

According to several aspects of the present invention, a battery cell includes a core, a source of thermal control fluid in fluid communication with the core, and a first pressure sensitive valve positioned between the core and the source of thermal control fluid, the first pressure sensitive valve adapted to open when pressure within the core exceeds a first pre-determined value.

According to another aspect, the source of thermal control fluid is positioned above the core, wherein when the first pressure sensitive valve is opened gravity will cause the thermal control fluid to flow downward into the core.

According to another aspect, the battery cell further includes a second pressure sensitive valve adapted to open when pressure within the source of thermal control fluid exceeds a second pre-determined pressure.

According to another aspect, the second pre-determined pressure is lower than the first pre-determined pressure.

According to another aspect, the second pressure sensitive valve is adapted to vent contents of the source of thermal control fluid out of the battery cell.

According to another aspect, the battery cell further includes a one-way valve adapted to be connected to a reservoir of thermal control fluid and adapted to allow thermal control fluid to flow from the reservoir of thermal control fluid into the source of thermal control fluid and to prevent flow from the source of thermal control fluid to the reservoir of thermal control fluid.

According to another aspect, the first and second pressure sensitive valves are re-usable zip-lock valves.

According to several aspects of the present invention, a battery includes a plurality of battery cells, each battery cell including a core, a source of thermal control fluid in fluid communication with the core, a first re-usable pressure sensitive valve positioned between the core and the source of thermal control fluid, the first pressure sensitive valve adapted to open when pressure within the core exceeds a first pre-determined value, the source of thermal control fluid positioned above the core, wherein when the first pressure sensitive valve is opened gravity will cause the thermal control fluid to flow downward into the core, and a second re-usable pressure sensitive valve adapted to open when pressure within the source of thermal control fluid exceeds a second pre-determined pressure that is lower than the first pre-determined pressure and to vent contents of the source of thermal control fluid out of the battery cell.

According to another aspect, the battery further includes a reservoir of thermal control fluid positioned above each of the plurality of battery cells, wherein the source of thermal control fluid of each of the plurality of battery cells is in fluid communication with the reservoir of thermal control fluid, each of the plurality of battery cells including a one-way valve positioned between the source of thermal control fluid and the reservoir of thermal control fluid, wherein for each of the plurality of battery cells, the one way valve is adapted to allow thermal control fluid to flow from the reservoir of thermal control fluid into the source of thermal control fluid and to prevent flow from the source of thermal control fluid to the reservoir of thermal control fluid, the reservoir of thermal control fluid adapted to supply thermal control fluid to the source of thermal control fluid within each of the plurality of battery cells at a pressure less than the first and second pre-determined pressures.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 5A is a view similar to FIG. 3A, wherein the battery cell includes a second pressure sensitive valve;

FIG. 5B is a view similar to FIG. 5A, wherein the first pressure sensitive valve is opened;

FIG. 5C is a vie similar to FIG. 5B, wherein both the first and second pressure sensitive valves are opened;

FIG. 6 is a perspective view of an exemplary embodiment of a battery cell including a one-way valve to supply thermal control fluid from a remotely located reservoir of thermal control fluid;

FIG. 7A is a view similar to FIG. 5A, wherein a one-way valve supplies thermal control fluid to the source of thermal control fluid from a remotely located reservoir of thermal control fluid;

FIG. 7B is a view similar to FIG. 7A, wherein the first pressure sensitive valve is opened;

FIG. 7C is a view similar to FIG. 7B, wherein both the first and second pressure sensitive valves are opened;

DETAILED DESCRIPTION

The following description is merely exemplary in nature and is not intended to limit the present disclosure, application, or uses.

Figure 1:
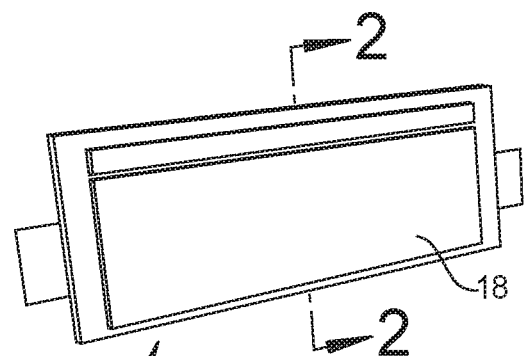
FIG. 1 is a perspective view of a battery cell according to an exemplary embodiment of the present disclosure.
Figure 2:
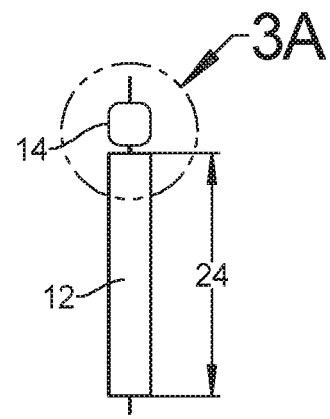
FIG. 2 is a sectional view taken along line 2-2 of FIG. 1.

Referring to FIG. 1 and FIG. 2, a battery cell 10 in accordance with the present disclosure includes a core 12, a source of thermal control fluid 14 in fluid communication with the core 12, and a first pressure sensitive valve 16 positioned between the core 12 and the source of thermal control fluid 14.

The core 12 includes the essential components of the battery cell 10, such as, but not limited to, the anode, electrolyte and separator, which are all enveloped by a sealed pouch 18. The source of thermal control fluid 14 is a container adapted to hold a volume of a thermal control fluid 20 that is adapted to slow or stop a thermal runaway event. The thermal control fluid 20 may be any suitable fluid, such as water or a fluid that has chemical properties specifically adapted to extinguish a thermal runaway event.

Figure 3A:
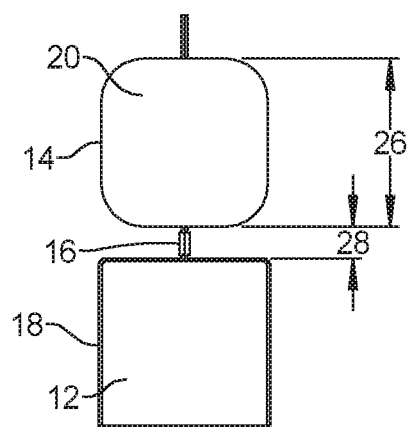
FIG. 3A is an enlarged portion of FIG. 2, as indicated by the dashed circle labelled FIG. 3A in FIG. 2.
Figure 3B:
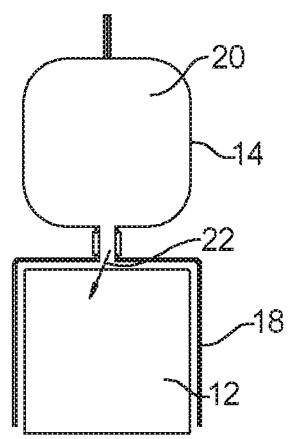
FIG. 3B is a view similar to FIG. 3A, wherein the first pressure sensitive valve has been opened.

Referring to FIG. 3A, the first pressure sensitive valve 16 keeps the thermal control fluid 20 within the source of thermal control fluid 14. Referring to FIG. 3B, when pressure within the core 12 exceeds a first pre-determined pressure, the first pressure sensitive valve 16 opens, allowing thermal control fluid 20 held within the source of thermal control fluid 14 to flow into the sealed pouch 18, as indicated by arrow 22, to slow or stop the thermal runaway event.

In an exemplary embodiment, the core has a height 24. The source of thermal control fluid 14 has a height 26 that is between 0.05 and 0.2 times the height 24 of the core 12.

In another exemplary embodiment, the source of thermal control fluid 14 is positioned above the core 12. When the first pressure sensitive valve 16 is opened gravity causes the thermal control fluid 20 to flow downward into the core 12, as indicated by arrow 22 in FIG. 3B. As shown in FIG. 3A, the source of thermal control fluid 14 is placed between 1 millimeter and 4 millimeters above the core 12, as indicated at 28 in FIG. 3A.

Figure 4:
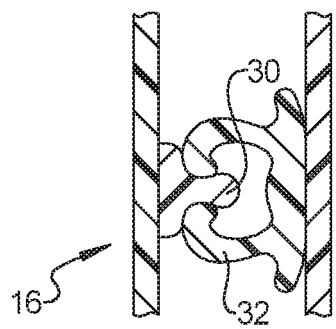
FIG. 4 is a sectional view of an example of a first pressure sensitive valve according to an exemplary embodiment.

In an exemplary embodiment, the first pressure sensitive valve 16 is a re-usable valve that can be closed and opened repeatedly. Referring to FIG. 4, by way of a non-limiting example, a re-usable first pressure sensitive valve 16 is a zip-lock style sealed valve. This zip-lock valve includes a ridge portion 30 that engages a channel portion 32. The engagement of the ridge and channel portions 30, 32 will remain sealed until the pressure within the core exceeds the first pre-determined pressure. The first pre-determined pressure is the pressure at which the force exerted on the first pressure sensitive valve 16 will cause the ridge and channel portions 30, 32 to disengage, thereby opening the first pressure sensitive valve 16. In another exemplary embodiment, the first pressure sensitive valve 16 is formed by heat sealing inner surfaces of the sealed pouch 18 together to form a seal. In still another exemplary embodiment, the first pressure sensitive valve 16 is formed by placing a strip of adhesive between inner surfaces of the sealed pouch 18 to form a seal that will release under a first pre-determined pressure. It should be understood that the first pressure sensitive valve 16 may be formed by any suitable method of forming a seal without departing from the scope of the present disclosure.

Referring to FIG. 5A, FIG. 5B and FIG. 5C, in another exemplary embodiment, the battery cell 10 includes a second pressure sensitive valve 34. The second pressure sensitive valve 34 is adapted to open when pressure within the source of thermal control fluid 14 exceeds a second pre-determined pressure. Similarly to the first pressure sensitive valve 16, the second pressure sensitive valve 34 may be re-usable and may be formed by any suitable method of forming a pressure sensitive seal without departing from the scope of the present disclosure.

Referring to FIG. 5A, in operation, the battery cell 10 begins to experience a thermal runaway event and the temperature and pressure within the sealed pouch 18 around the core 12 begins to increase. When the pressure within the sealed pouch 18 surrounding the core 12 reaches the first pre-determined pressure, the first pressure sensitive valve 16 opens and releases the thermal control fluid 20 into the core 12, as shown by arrows 36 in FIG. 5B. The sealed pouch 18 is designed to withstand a maximum pressure of approximately 5 bar. The first pre-determined pressure is a pressure that is safely less than this maximum pressure. In an exemplary embodiment, the first pre-determined pressure is between approximately 3 bar and 4 bar.

Steam and other gases are generated within the core 12 due to the thermal runaway event and the reaction of the thermal control fluid 20 with the components in the core 12. This will cause the pressure within both the core 12 and the now interconnected source of thermal control fluid 14 to rise. Referring to FIG. 5C, when the pressure within the source of thermal control fluid 14 reaches the second pre-determined pressure, the second pressure sensitive valve 34 opens to release steam and gases generated in the core 12 from the battery cell 10, as indicated by arrows 38. This helps to stop the thermal runaway event by removing potentially flammable battery gases from within the battery cell 10. It is desirable that the second pre-determined pressure is lower than the first pre-determined pressure, to prevent high pressure gases from building within the core 12 and the source of thermal control fluid 14.

Referring to FIG. 6, in another exemplary embodiment, the battery cell 10 includes a one-way valve 40 adapted to be connected to a reservoir of thermal control fluid 42. The one-way valve 40 will allow thermal control fluid 20 to flow from the reservoir of thermal control fluid 42 into the source of thermal control fluid 14, as indicated by arrow 44, and will prevent flow from the source of thermal control fluid 14 back to the reservoir of thermal control fluid 42.

Referring to FIG. 7A, in operation, the battery cell 10 begins to experience a thermal runaway event and the temperature and pressure within the sealed pouch 18 around the core 12 begins to increase. When the pressure within the sealed pouch 18 surrounding the core 12 reaches the first pre-determined pressure, the first pressure sensitive valve 16 opens and releases the thermal control fluid 20 into the core 12, as shown by arrows 46 in FIG. 7B. After the initial volume of thermal control fluid 20 within the source of thermal control fluid 14 flows into the core 12, additional thermal control fluid 20 from a remotely located reservoir of thermal control fluid 42 flows into the source of thermal control fluid 14, as indicated by arrows 48 in FIG. 7B.

Steam and other gases are generated within the core 12 due to the thermal runaway event and the reaction of the thermal control fluid 20 with the components in the core 12. This will cause the pressure within both the core 12 and the now interconnected source of thermal control fluid 14 to rise. Referring to FIG. 7C, when the pressure within the source of thermal control fluid 14 reaches the second pre-determined pressure, the second pressure sensitive valve 34 opens to release steam and gases generated in the core 12 from the battery cell 10, as indicated by arrows 50. It is desirable that the second pre-determined pressure is lower than the first pre-determined pressure, to prevent high pressure gases from building within the source of thermal control fluid.

In another exemplary embodiment, the battery cell 10 does not include a local source of thermal control fluid 14, rather, the one-way valve 40 and the first pressure sensitive valve 16 are integrated into a single valve, wherein thermal control fluid 20 flows directly into the core 12 from the remotely located reservoir of thermal control fluid 42 when the pressure within the core 12 exceeds the first pre-determined pressure.

Figure 8:
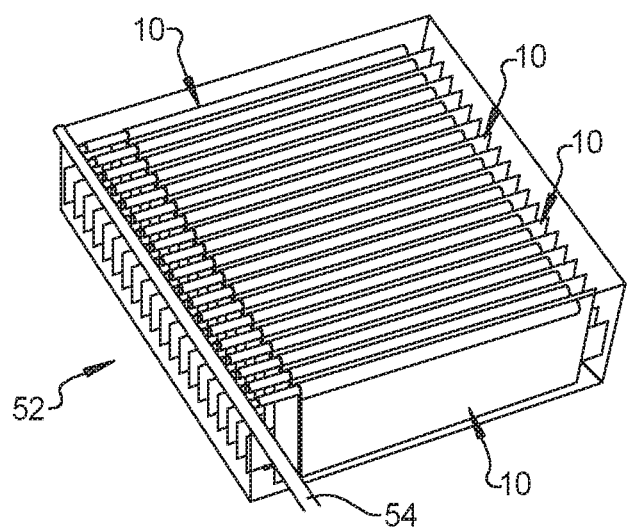
FIG. 8 is a perspective view of a battery pack in accordance with an exemplary embodiment.
Figure 9:
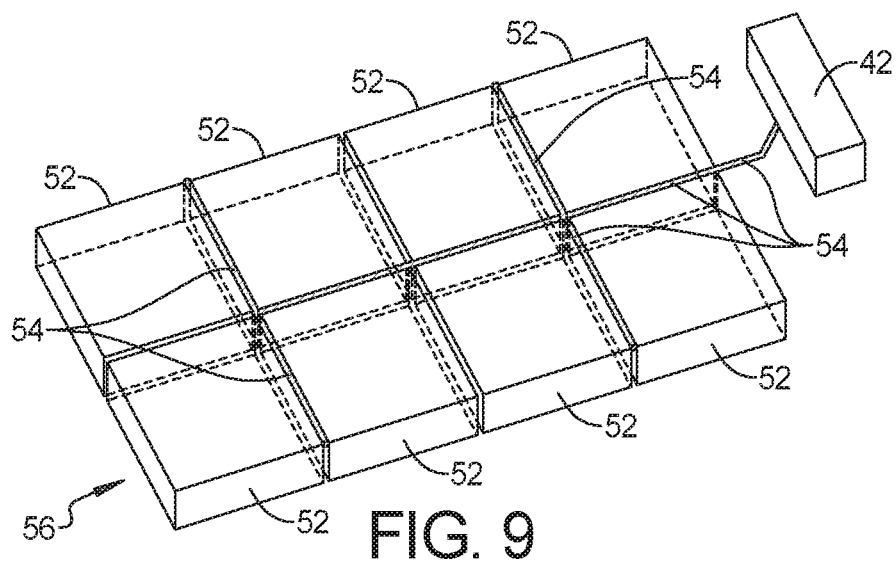
FIG. 9 is a perspective schematic view of a battery having eight battery packs supplied by a reservoir of thermal control fluid.

Referring to FIG. 8, a battery pack 52 is shown that includes a plurality of battery cells 10. A fluid conduit 54 feeds thermal control fluid 20 from a remotely located reservoir of thermal control fluid 42 to each of the individual battery cells 10. Referring to FIG. 9, a battery 56 is shown that includes eight battery packs 52. The fluid conduit 54 feeds all of the battery cells 10 of all eight of the battery packs 52 from a reservoir of thermal control fluid 42.

Figure 10:
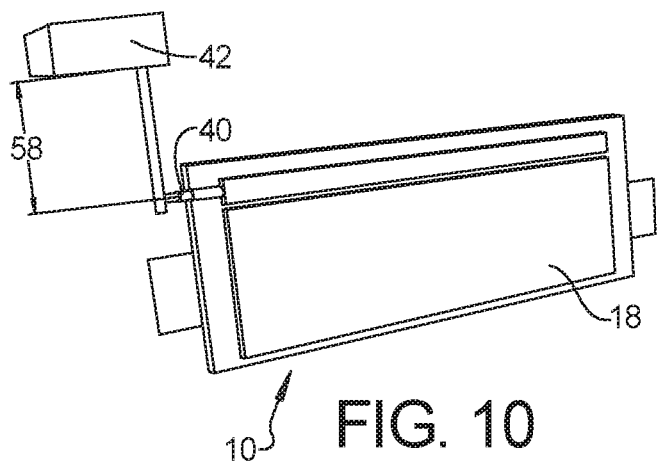
FIG. 10 is a perspective view illustrating the placement of the reservoir of thermal control fluid relative to a battery cell.

Referring to FIG. 10, the reservoir of thermal control fluid 42 is positioned above each of the plurality of battery cells 10, wherein, for each of the plurality of battery cells 10, when the first pressure sensitive valve 16 is opened gravity will cause the thermal control fluid 20 to flow from the reservoir of thermal control fluid 42 downward into the source of thermal control fluid 14. The height 58 of the reservoir of thermal control fluid 42 above the battery packs 52 will determine the pressure at which the thermal control fluid 20 will be delivered to the battery cells 10, and consequently, how fast the core 12 of an affected battery cell 10 will fill with thermal control fluid 20 during a thermal runaway event.

To ensure proper functioning, the reservoir of thermal control fluid 42 is adapted to supply thermal control fluid 20 to the source of thermal control fluid 14 within each of the plurality of battery cells 10 at a pressure less than the first and second pre-determined pressures. This will prevent the first and second pressure sensitive valves 16, 34 from being inadvertently opened. In an exemplary embodiment, the reservoir of thermal control fluid 42 is positioned 100 millimeters above the eight battery packs 52.

By using a remotely located reservoir of thermal control fluid 42, the total volume of thermal control fluid 20 is reduced. The remotely located reservoir of thermal control fluid 42 can hold sufficient thermal control fluid 20 to supply a small number of battery cells 10 that may experience a thermal runaway event within a battery 56. The volume of thermal control fluid 20 that is stored within a remotely located reservoir of thermal control fluid 42 is much less than the cumulative volume of thermal control fluid 20 that would be needed if each individual battery cell 10 stored sufficient thermal control fluid 20 for a thermal runaway event within such battery cell 10. By reducing the total volume of thermal control fluid 20, and reducing or eliminating the individual source of thermal control fluid 14 for each battery cell 10, the size of the battery cells 10 is reduced, and correspondingly, the size of the battery packs 52 and the battery 56 are reduced.

A battery cell 10 and battery 56 of the present disclosure provides passive and automatic reaction when a battery cell 10 is approaching or has begun a thermal runaway event which will slow or stop the thermal runaway event by dousing the core 12 of the battery cell 10 with thermal control fluid 20 to extinguish combustion within the core 12 and by exhausting flammable gases from the core 12 to prevent further combustion. Further, the battery cell 10 and battery 56 of the present disclosure utilizes re-sealable pressure sensitive valves 16, 34 that provides the ability to re-use a battery cell 10 that has experienced a thermal runaway event. After a thermal runaway event, the core 12 of an affected battery cell 10 can be replaced, and the pressure sensitive valves 16, 34 can be re-sealed, once again isolating the core 12 from the source of thermal control fluid 14, and the source of thermal control fluid 14 or the reservoir of thermal control fluid 42 can be re-filled.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A battery comprising: a plurality of battery cells, each battery cell including:
    a core;
    a source of thermal control fluid in fluid communication with the core; and
    a first re-usable pressure sensitive valve positioned between the core and the source of thermal control fluid, the first pressure sensitive valve adapted to open when pressure within the core exceeds a first pre-determined value, the first pressure sensitive valve including a ridge portion in engagement with a channel portion, the ridge portion and the channel portion of the first pressure sensitive valve adapted to disengage when pressure within the core exceeds the first pre-determined value, wherein, within each of the plurality of battery cells, the source of thermal control fluid is positioned above the core, wherein when the first pressure sensitive valve is opened gravity will cause the thermal control fluid to flow downward into the core; and
    a second re-usable pressure sensitive valve adapted to open when pressure within the source of thermal control fluid exceeds a second pre-determined pressure, the second pressure sensitive valve including a ridge portion in engagement with a channel portion, the ridge portion and the channel portion of the second pressure sensitive valve adapted to disengage when pressure within the source of thermal control fluid exceeds the second pre-determined pressure.

2. The battery of claim 1, wherein the second pre-determined pressure is lower than the first pre-determined pressure.

3. The battery of claim 2, wherein the second pressure sensitive valve of each of the plurality of battery cells is adapted to vent contents of the source of thermal control fluid out of the battery cell.

4. The battery of claim 3, further including a reservoir of thermal control fluid, wherein the source of thermal control fluid of each of the plurality of battery cells is in fluid communication with the reservoir of thermal control fluid.

5. The battery of claim 4, wherein each of the plurality of battery cells includes a one-way valve positioned between the source of thermal control fluid and the reservoir of thermal control fluid, wherein for each of the plurality of battery cells, the one way valve is adapted to allow thermal control fluid to flow from the reservoir of thermal control fluid into the source of thermal control fluid and to prevent flow from the source of thermal control fluid to the reservoir of thermal control fluid.

6. The battery of claim 5, wherein the reservoir of thermal control fluid is adapted to supply thermal control fluid to the source of thermal control fluid within each of the plurality of battery cells at a pressure less than the first and second pre-determined pressures.

7. The battery of claim 6, wherein, the reservoir of thermal control fluid is positioned above each of the plurality of battery cells, wherein, for each of the plurality of battery cells, when the first pressure sensitive valve is opened gravity will cause the thermal control fluid to flow from the reservoir of thermal control fluid downward into the source of thermal control fluid.

8. The battery of claim 7, wherein the first and second pressure sensitive valves can be repeatedly opened and closed and are re-usable.

9. A battery cell comprising:
    a core;
    a source of thermal control fluid in fluid communication with the core; and
    a first re-usable pressure sensitive valve positioned between the core and the source of thermal control fluid, the first pressure sensitive valve adapted to open when pressure within the core exceeds a first pre-determined value, the first pressure sensitive valve including a ridge portion in engagement with a channel portion, the ridge portion and the channel portion of the first pressure sensitive valve adapted to disengage when pressure within the core exceeds the first pre-determined value, wherein the source of thermal control fluid is positioned above the core, wherein when the first pressure sensitive valve is opened gravity will cause the thermal control fluid to flow downward into the core;
    a second re-usable pressure sensitive valve adapted to open when pressure within the source of thermal control fluid exceeds a second pre-determined pressure, the second pressure sensitive valve including a ridge portion in engagement with a channel portion, the ridge portion and the channel portion of the second pressure sensitive valve adapted to disengage when pressure within the source of thermal control fluid exceeds the second pre-determined pressure.

10. The battery cell of claim 9, wherein the second pre-determined pressure is lower than the first pre-determined pressure.

11. The battery cell of claim 10, wherein the second pressure sensitive valve is adapted to vent contents of the source of thermal control fluid out of the battery cell.

12. The battery cell of claim 11, further including a one-way valve adapted to be connected to a reservoir of thermal control fluid and adapted to allow thermal control fluid to flow from the reservoir of thermal control fluid into the source of thermal control fluid and to prevent flow from the source of thermal control fluid to the reservoir of thermal control fluid.

13. A battery comprising:
a plurality of battery cells, each battery cell including:
a core;
a source of thermal control fluid in fluid communication with the core;
a first re-usable zip-lock pressure sensitive valve positioned between the core and the source of thermal control fluid, the first pressure sensitive valve including a ridge portion in engagement with a channel portion, the ridge portion and the channel portion of the first pressure sensitive valve adapted to open when pressure within the core exceeds a first pre-determined value, the source of thermal control fluid positioned above the core, wherein when the first pressure sensitive valve is opened gravity will cause the thermal control fluid to flow downward into the core; and
a second re-usable zip-lock pressure sensitive valve including a ridge portion in engagement with a channel portion, the ridge portion and the channel portion of the second pressure sensitive valve adapted to open when pressure within the source of thermal control fluid exceeds a second pre-determined pressure that is lower than the first pre-determined pressure and to vent contents of the source of thermal control fluid out of the battery cell.

14. The battery of claim 13, further including a reservoir of thermal control fluid positioned above each of the plurality of battery cells, wherein the source of thermal control fluid of each of the plurality of battery cells is in fluid communication with the reservoir of thermal control fluid, each of the plurality of battery cells including a one-way valve positioned between the source of thermal control fluid and the reservoir of thermal control fluid, wherein for each of the plurality of battery cells, the one way valve is adapted to allow thermal control fluid to flow from the reservoir of thermal control fluid into the source of thermal control fluid and to prevent flow from the source of thermal control fluid to the reservoir of thermal control fluid, the reservoir of thermal control fluid adapted to supply thermal control fluid to the source of thermal control fluid within each of the plurality of battery cells at a pressure less than the first and second pre-determined pressures.

* * * * *